US012762281B2

(12) United States Patent
Cardenes Cabre et al.

(10) Patent No.: US 12,762,281 B2
(45) Date of Patent: Oct. 13, 2026

(54) VERIFIABLE ANONYMOUS DATA AGGREGATION

(71) Applicant: Via Science, Inc., Somerville, MA (US)

(72) Inventors: Jesus Alejandro Cardenes Cabre, Montreal (CA); John Christopher Muddle, St. Albans (GB); Madjid Aoudia, Rennes (FR); Jeremy Taylor, Montreal (CA)

(73) Assignee: Via Science, Inc., Somerville, MA (US)

( * ) Notice: Subject to any disclaimer, the term of this patent is extended or adjusted under 35 U.S.C. 154(b) by 0 days.

(21) Appl. No.: 19/411,979

(22) Filed: Dec. 8, 2025

(65) Prior Publication Data

US 2026/0161824 A1 Jun. 11, 2026

Related U.S. Application Data

(60) Provisional application No. 63/730,095, filed on Dec. 10, 2024.

(51) Int. Cl.
*G06F 21/62* (2013.01)
*G06F 21/64* (2013.01)

(52) U.S. Cl.
CPC .......... *G06F 21/6254* (2013.01); *G06F 21/64* (2013.01)

(58) Field of Classification Search
USPC .......................................................... 726/27
See application file for complete search history.

(56) References Cited

U.S. PATENT DOCUMENTS

2015/0074819 A1* 3/2015 Borenstein ........... G06F 16/213 707/706
2020/0082290 A1* 3/2020 Pascale .................. G06N 20/00
2020/0089912 A1* 3/2020 Mital .................... H04L 63/101
2021/0200901 A1* 7/2021 Vemula ............... G06F 18/2323
2022/0109700 A1 4/2022 Guruswamy et al.
2022/0343020 A1* 10/2022 Farre Guiu ............ G06N 3/045
2022/0360450 A1 11/2022 Brandenburger et al.
2022/0374550 A1 11/2022 Yagi
2023/0137436 A1* 5/2023 Chen ....................... G06F 21/57 726/26
2023/0239134 A1 7/2023 Salomon et al.

OTHER PUBLICATIONS

Invitation to Pay Additional Fees and, Where Applicable, Protest Fee, for International Patent Application No. PCT/US2025/058571, mailed on Apr. 7, 2026, 13 pages.
Asghar, M. and Russello, G. "Flexible and Dynamic Consent-Capturing." Open Problems in Network Security, Lecture Notes in Computer Science 7039 (2012), 13 pages.
Notification of Transmittal of the International Search Report and the Written Opinion, for International Patent Application No. PCT/US2025/058571, mailed on Jun. 1, 2026, 22 pages.

* cited by examiner

*Primary Examiner* — Sanchit K Sarker
(74) *Attorney, Agent, or Firm* — Pierce Atwood LLP

(57) ABSTRACT

A system may be configured to combine zero-knowledge transport layer security (zkTLS) and AttestedHTTPS to allow authors to create functions for the anonymization and aggregation of data such that the functions may be reproduced in a deterministic, verifiable way. the system may allow data uploaders and others to trust that data has been uploaded and anonymized in a secure and verifiable way. The system may provide requestors with the results of aggregation in a manner that allows the requestor to prove that the result is the output of a verified function executed on anonymized data with the approval of the data uploaders.

12 Claims, 9 Drawing Sheets

VERIFIABLE ANONYMOUS DATA AGGREGATION

CROSS-REFERENCE TO RELATED APPLICATION

This application claims the benefit of priority of U.S. Provisional Patent Application No. 63/730,095, filed Dec. 10, 2024, and entitled "Verifiable Anonymization Using Verifiable Credentials," the content of which is incorporated herein by reference in its entirety.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
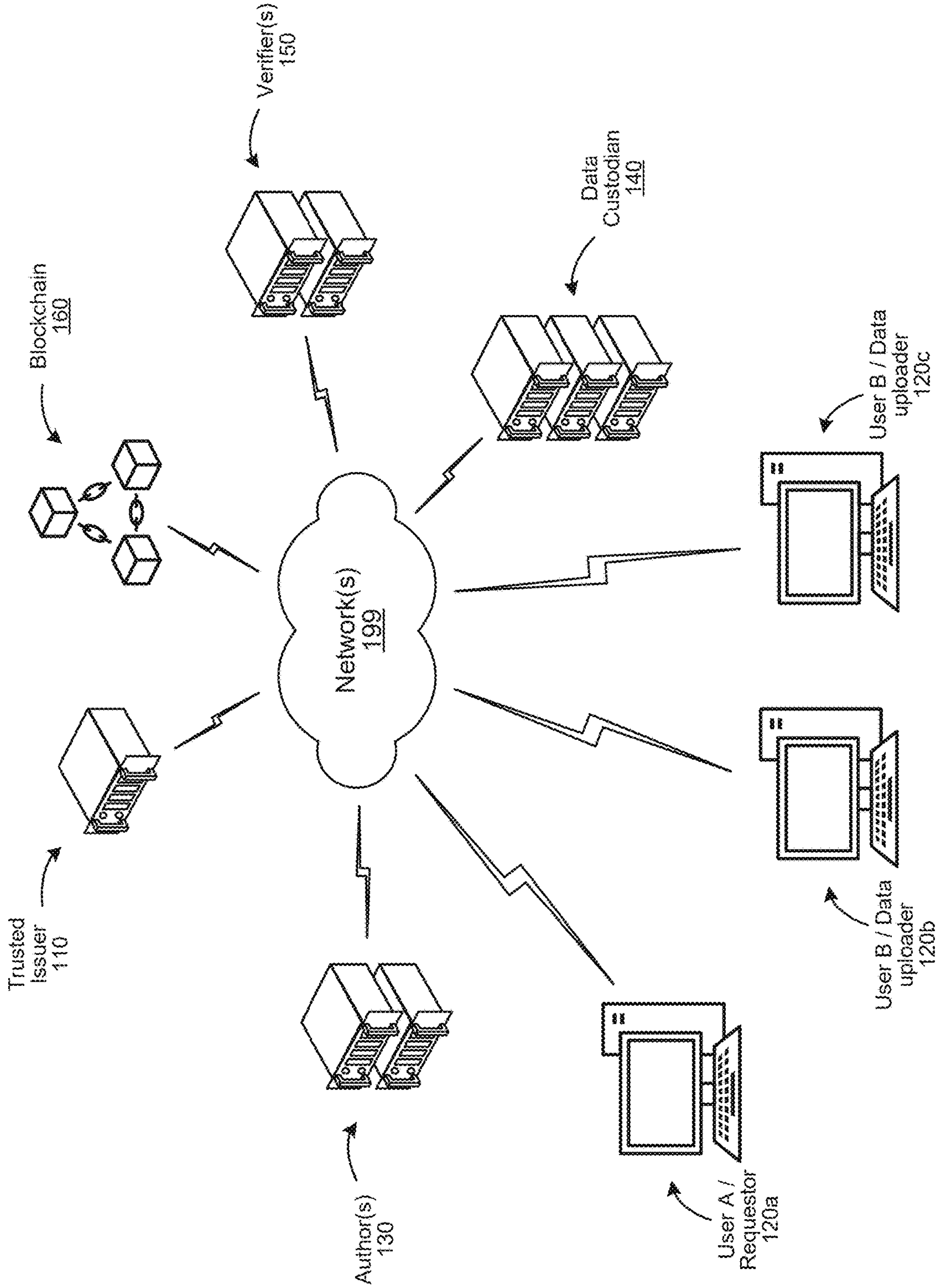
FIG. 1A is a conceptual diagram illustrating verifiable anonymous data aggregation, according to embodiments of the present disclosure.

Offered herein are systems and methods for performing verifiable ingestion, anonymization, and/or aggregation of data. For example, the system may allow a data uploader to prove that the endpoint to which they submit data will only run a specific, pre-approved anonymization script. Once the system has ingested the data as well as data from other uploaders, the system may allow a user (who may be a data uploader and/or an aggregation requestor) to verify that the output of an aggregation process is the legitimate and correct result of running a specific, pre-defined aggregation on the specific data created during the ingestion phase.

An author (e.g., of the aggregation code and/or anonymization script) may upload a uniquely identifiable function to a high-integrity data source such as a distributed ledger (e.g., a blockchain). The function may be defined by a software bill of materials (SBOM), which specifies a reproducible container such as an Open Container Initiative (OCI) container. The uploaded function may be assigned a code identifier (code_id) such that requesting execution of the code_id is an unambiguous, deterministic, and reproducible operation, whether for anonymization or aggregation. Thus, an entity that requests the execution of code_id can have assurance that the reconstructed function will perform according to the author's statements.

The system may use a zero-knowledge Transport Layer Security (zkTLS) technique to create an AttestedHTTPSStatement (where HTTPS stands for hypertext transfer protocol secure). The AttestedHTTPSStatement represents a zero-knowledge proof (ZKP) that proves a specific HTTPS response was returned from a specific URL and was cryptographically signed by a trusted identity (for example, Google Cloud Platform (GCP), Microsoft Azure, IBM Cloud Services, etc.). This may allow a user to trust the output of a remote service to provide inputs to a computation that can be run in a trustless (e.g., verifiable) way.

The system may operate among various parties who may receive verifiable credentials (VCs) from a trusted issuer. The trusted issuer may anchor the trust of the system by defining the roles of the various parties and granting VCs corresponding to the roles. The VCs may specify permissions granted to and/or restrictions placed on a particular role or party. For example, the trusted issuer may grant an author a VC that corresponds to permission to create and submit functions corresponding to certain classes and/or a restrictions on other classes. Similarly, the trusted issuer may create one or more verifier roles, and assign a verifier a VC granting permissions to verify functions corresponding to certain classes and/or authors. In some implementations, the trusted issuer may be an identity provider (IdP). In some implementations, the trusted issuer may be operated by and/or under the control of an organization, such as an organization providing the verifiable anonymous data aggregation services to the users of the system.

The trusted issuer may grant VCs to users to give them permission to upload data and/or request aggregation of uploaded data (e.g., originating from other users as well as themselves). A data uploader may be a user who contributes data (e.g., sensitive data) for aggregation and/or other processing. In some cases, they may run OCI code on their data prior to upload to, for example, perform basic anonymization (e.g., Mondrian k-anonymity, a differential privacy algorithm, etc.). The OCI code may be specified on the blockchain and run as a ZKP such that consumers of the uploaded data can know that they have received a verifiably anonymous/private version of the raw data. A requestor (who may also be a data uploader) may request aggregation and receive results in a manner that allows them to verify and prove to others that The trusted issuer may provide VCs to an anonymizer author and/or an aggregate author. The anonymizer author may be a party trusted to create anonymization logic. The anonymizer author may write anonymization code (anon_code_id) and use their VC to make a statement about its properties; for example, "anon_code_id removes all nine personally identifiable information (PII) types and logs nothing." Similarly, the aggregate author may be a party trusted to write analysis code (agg_code_id) to be run on data (e.g., data previously anonymized using anon_code_id).

A data custodian may be a trusted function-as-a-service (FaaS) provider. The data custodian may have multiple responsibilities including hosting a verifiable upload endpoint, which it may bind to anon_code_id (e.g., any data uploaded to the endpoint will undergo anonymization per the script specified by anon_code_id). The data custodian may also host components and/or services for executing the anonymization script and aggregation code (e.g., anon_code_id/agg_code_id). The data custodian may run the requested code based on an HTTPS call and produce the AttestedHTTPS result.

The trusted issuer may provide VCs to an anonymization verifier and/or an aggregation verifier. The anonymization verifier may be trusted to verify that a given code_id accomplishes a specific task such as "PII Free." The aggregation verifier may be trusted to validate the results of an aggregation process (e.g., running agg_code_id on data_x, data_y). The anonymization verifier and/or the aggregation verifier may publish a verification code identifier (ver_code_id) that audits the work of the aggregate author(s) and data custodian(s).

Different VCs can correspond to different permissions. For example, a VC may specify that a particular author may state that an aggregation function they create has a particular property or capability, such that the function obeys k-anonymity, differential privacy, etc. (e.g., one but not the other, both, all, etc.). Similarly, a VC may specify that a particular verifier may verify a particular class or classes (e.g., k-anonymity, differential privacy, etc.), all classes, or some classes but not others. The verifier VC may additionally or alternatively specify that the particular verifier may or may not verify functions created by a particular author or authors. In some cases, a VC may allow a verifier to verify functions created by authors within the verifier's organization, but a higher level of credential may be needed to verify functions created by authors outside of the organization.

With the roles so defined, the system may allow a data uploader to POST sensitive data to the endpoint with a cryptographic guarantee that the endpoint is running the correct anonymization script. The data uploader may do so by using the code_id created by an anonymization author that has proved possession of the appropriate VC from the trusted issuer. In some implementations, the system may also use AttestedHTTPS of code run on event logs on an FaaS or platform as a service (PaaS) to back up claims about lifecycle events (e.g., data upload and deletion, etc.).

Once the system has anonymized and ingested data from multiple data uploaders, a requestor may submit an aggregate query for some output based on a verified/verifiable aggregation process. The system may prompt the data uploaders for approval to aggregate the data using the aggregation function requested by the requestor. Upon receiving approval, the system may execute the aggregation function and return the aggregation result to the requestor with an AttestedHTTPS statement. The requestor can further request verification of the aggregation result from the system, and use the verification result to prove to other users that all inputs were used with approval, that agg_code_id was run on anonymized versions of the inputs, that all statements regarding agg_code_id have been verified, and that the output is the result.

Thus, the system can combine zkTLS and AttestedHTTPS to allow authors to create aggregation and anonymization functions in a reproducible, verifiable way; allow data uploaders and others to trust that data has been uploaded and anonymized in a secure and verifiable way; and provide requestors with the results of aggregation functions in a manner that allows the requestor to prove that the result is the output of a verified function executed on anonymized data with the approval of the data uploaders.

The systems and methods described herein have various use cases where verifiable anonymization and/or aggregation may be useful. For example, a manufacturer may produce physical components such as transformers for an electrical grid, automobiles or automobile parts, medical devices or systems, etc. The manufacturer may wish to provide a service that allows their customers to analyze data based on use of the components for various purposes such as predicting and/or preventing failures. Customers may wish to analyze their data as well as that of other customers; however, customers may need assurances that the data that both they themselves provide as well as other customer data aggregated for the analysis has been properly scrubbed of PII or other sensitive data. The customers may further wish to verify and/or prove that the data was aggregated in a certain way (e.g., using a specific agg_code_id) and that the result was based on approved anonymized inputs.

Various other use cases of the described system are possible. These features may be used alone or in combination with each other and/or other features described herein. Various operations of the systems and devices may be subject to user approval. The system may be implemented in a manner that ensures compliance with applicable laws, regulations, standards, etc., in the region(s) where the user, devices, and/or systems are located.

FIG. 1A is a conceptual diagram illustrating verifiable anonymous data aggregation, according to embodiments of the present disclosure. Various components representing the various parties may interact across one or more computer networks 199 to upload data and verify code, scripts, data, results of running code and/or performing verifications, and so forth. The components may include one or more users 120 including a user A 120*a*, a user B 120*b*, a user C 120*c*, etc. (collectively "users 120"). In some cases, a user (e.g., user A 120*a*) may act as a requestor (e.g., of an aggregate query). Some or all of the users, including user a 120*a*, may act as data uploaders. One or more authors 130 may create scripts for anonymizing data and/or code for aggregating (anonymized) data. One or more verifiers 150 may verify anonymization scripts and/or aggregation code created by the author(s) 130. A data custodian 140 may host several functions, components, and/or services such as those that host verifiable endpoints and execute anonymization scripts and/or aggregation code. A trusted issuer 110 may define roles and provide VCs to individual parties that correspond to their individual roles and/or permissions granted to them. The parties may store and/or retrieve various artifacts from a distributed ledger such as a blockchain 160.

The various components shown in FIG. 1A may be made up of and/or execute on one or more devices 600 and/or system components 650 as described below with reference to FIG. 6. For example, a user 120 may include one or more devices 600 such as mobile phone or laptop, desktop, or tablet computer. In some cases, a user 120 may execute on one or more system components 650 (e.g., hosting a virtual machine, container, etc.). Similarly, the author(s) 130, verifier(s) 150, data custodian(s) 140, trusted issuer 110, and/or blockchain 160 may be made up of and/or execute on one or more devices 600 and/or system components 650. As used herein, "the system" may refer to one or more components that can provide verifiable anonymous data aggregation. For example in various implementations, the "system" may refer to the functions, components, and/or capabilities of the data custodian 140. In some implementations, the "system" may include the author(s) 130 and/or verifier(s) 150 as well. In various implementations, however, the components may correspond to different parties who may work together but operate independently. The various parties/components are described in further detail below with reference to FIG. 1B.

Figure 1B:
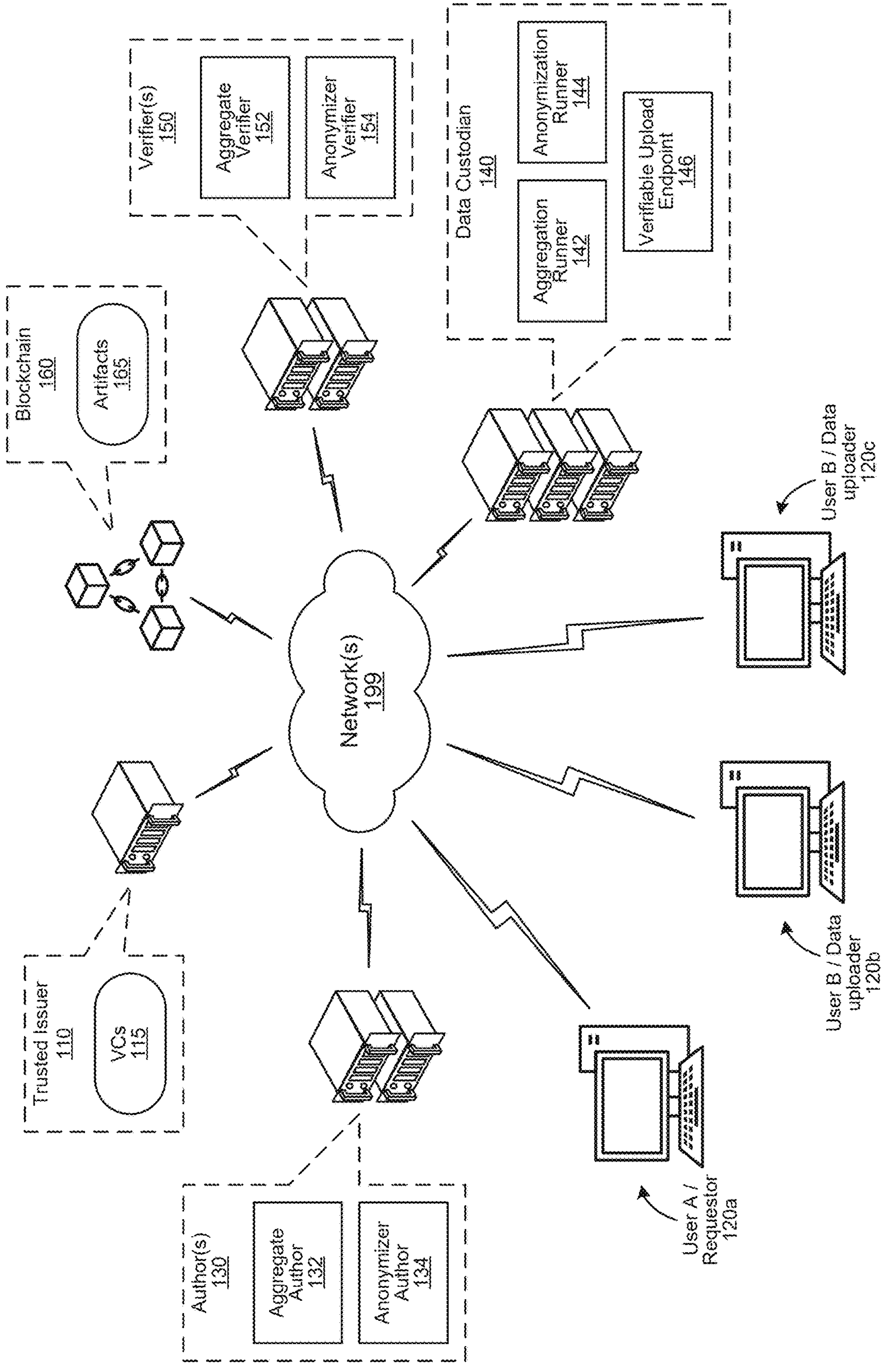
FIG. 1B illustrates components involved in verifiable anonymous data aggregation in further detail, according to embodiments of the present disclosure.

FIG. 1B illustrates the components involved in verifiable anonymous data aggregation in further detail, according to embodiments of the present disclosure. The trusted issuer 110 may anchor the trust of the system by defining the roles of the various parties and granting VCs 115 corresponding to the roles. The VCs 115 may specify permissions granted to and/or restrictions placed on a particular role or party. For example, the trusted issuer 110 may grant an author a VC 115 that corresponds to permission to create and submit functions corresponding to certain classes and/or a restrictions on other classes.

In some implementations, the trusted issuer 110 may be, for example, an identity provider (IdP). In some implementations, the trusted issuer 110 may be operated by and/or under the control of an organization, such as an organization providing the verifiable anonymous data aggregation services to the user(s) 120. For example, the trusted issuer 110 may be a manufacturer and the users may be customers operating components made by the manufacturer. A user may wish to analyze data resulting from their own use and monitoring of components as well as data uploaded by the other users.

The system may make the verifiable anonymous data aggregation services to various users 120. A user 120 may be a data uploader and/or a requestor of aggregated data. In the example environments shown in FIGS. 1A and 1B, user A 120*a* is designated as the requestor while user B 120*b* and user C 120*c* are designated as data uploaders; however, user A 120*a* may also upload data and user B 120*b* and/or user C 120*c* may also request data aggregation. In some scenarios, the system may service more users (perhaps many more).

A data uploader may be a party or entity that needs to contribute sensitive data to the system. A data uploader may desire assurance that their data will be sufficiently anonymized before they will upload it to the system. In some cases, the system (e.g., the data custodian 140) may request that a user 120 execute an anonymization function locally (e.g., on the user's device 600 and/or system component 650) by running OCI code on their data before prior to upload. In some cases, the anonymization function may be specified on the blockchain 160 and run as a zero-knowledge proof (ZKP), verifiably demonstrating to consumers of the data (e.g., the requestor) that the data stored by the system is the anonymized version of the uploader's raw data.

One or more authors 130 may create anonymization and/or aggregation functions for use by the data custodian 140. An aggregate author 132 may create an aggregation function (e.g., "Quarterly Revenue Report"), which the aggregate author 132 may then upload to a high-integrity data source such as the blockchain 160 as a uniquely identifiable function. The uploaded function may be assigned a code identifier (agg_code_id). The function may be defined by an SBOM, which specifies a reproducible container such as an OCI container. The SBOM may begin with a base image from a trusted provider such as Iron Bank offered by Platform One, which provides a vetted repository of assessed containers for the United States Military and others. An author 130 may begin with the base image and add layers (e.g., using Python files and/or other code). The resulting SBOM will correspond to a new container with the added layers. The author may create a digest identifier representing a hash of the contents of the container. As the author 130 adds layers, the hash changes. In some cases the digest identifier (e.g., the hash) may be used as the agg_code_id (or, in the case of an anonymization script, the anon_code_id). Ultimately, the agg_code_id can be used to reproduce and/or verify the author's container. Programs such as aggregation or anonymization code running inside a container can see only the container's contents and, in some cases, devices assigned to the container. Thus, the execution of an agg_code_id container is an unambiguous, deterministic, and reproducible operation, regardless of where the container is reproduced and executed.

The aggregate author 132 may make a statement about the function. The type of statement the aggregate author 132 may make (e.g., what type of statement a verifier 150 may verify) may be dictated by the trusted issuer 110 and the VC 115 bestowed on the aggregate author 132. For example, the aggregate author 132 may make a query_statement stating that the agg_code_id conforms to "differential privacy", "k-anonymity", "Homomorphic Encrypted Aggregation (HEAgg)", etc. The aggregate author 132 may upload the signed statement to the blockchain 160 along with the agg_code_id. This may tie the function specified by agg_code_id to the statement(s) made about the function, and memorialize the relationship between agg_code_id and the statement(s) for verification and/or use by other components of the system.

An anonymization author 134 may create an anonymization function (e.g., "PII_Scrubber_V2"), which the anonymization author 134 may then upload to the blockchain 160 as a uniquely identifiable function. Similar to aggregation functions, the uploaded anonymization function may be assigned a code identifier (anon_code_id) and be defined by an SBOM such that execution of anon_code_id is an unambiguous, deterministic, and reproducible operation.

The anonymization author 134 may make a statement about the function and upload the signed statement to the blockchain 160. An example statement may be, for example, "anon_code_id removes all nine PII types and logs nothing." The type of statement the anonymization author 134 may make (e.g., what type of statement a verifier 150 may verify) may be dictated by the trusted issuer 110 and the VC 115 bestowed on the anonymization author 134. For example, the VC 115 may permit the anonymization author 134 to or prohibit it from stating that anon_code_id satisfies k-anonymity, differential privacy, etc.

The data custodian 140 may be, for example, a trusted FaaS and/or PaaS provider. The data custodian 140 may be responsible for hosting an aggregation runner 142, an anonymization runner 144, and a verifiable upload endpoint 146. The aggregation runner 142 may execute aggregation functions based on the OCI configuration specified by the SBOM associated with a requested agg_code_id. The aggregation runner 142 may execute the aggregation function in response to an HTTPS call received by the data custodian 140, which may return the result as or with an AttestedHTTPSStatement.

The anonymization runner 144 may execute an anonymization script in response to an HTTPS call received by the data custodian 140 to run anon_code_id. The anonymization runner 144 may return the result as or with an AttestedHTTPSStatement.

The data custodian 140 also hosts a verifiable upload endpoint 146. This may be a publicly available endpoint corresponding to a uniform resource locator (URL) (e.g., https://api.custodian.com/upload). The data custodian 140 may bind the anon_code_id to the URL such that any data uploaded to the URL will be verified to have been anonymized using the function corresponding to the bound anon_code_id. For example, a proxy and/or load balancer may receive calls directed to the endpoint 146 corresponding to the URL, and direct the calls to run an OCI container corresponding to anon_code_id. Thus, a zkTLS-like query to "custodian.com" may result in an AttestedHTTPS document that says "api.custodian.com" runs "an OCI container with code_id_x", and if code_id_x matches anon_code_id, the URL call ran anon_code_id. Therefore, if the data uploader trusts "custodian.com" (e.g., because it is hosted by a reliable organization), then the data uploader can trust the AttestedHTTPS statement that says the uploaded data was anonymized using anon_code_id.

To make the endpoint 146 verifiable, the data custodian 140 may also expose a "Describe API" endpoint that allows users 120 (and/or others) to inspect the configuration of the function hosted at the endpoint 146. These may be common features, which may be referred to generally as API gateways and FaaS hosted in cloud environments. A user 120 should be able to trust that the URL does indeed call a specific function (e.g., agg_code_id, anon_code_id, ver_code_id, etc.), and that the function corresponds to a specific OCI container with a specific digest (e.g., corresponding to a hash of the SBOM uploaded to the blockchain 160).

One or more verifiers 150 may verify functions uploaded by the author(s) 130. A verifier 150 may create a verification script and set forth what type of functions or statements the verification script may verify. The result of successfully running the verification script may convey that the verifier 150 has read the aggregate/anonymization code and it works—if someone asks about agg_code_id/anon_code_id, the verifier 150 will state that it satisfies the statement or statements made by the author 130 about the code. The verifier 150 may upload a statement about verifying the code to the blockchain 160. This may tie the code verification to the code_id.

The types of functions or statements the verification script may verify may be dictated by the VC 115 bestowed by the trusted issuer 110. In some cases, the trusted issuer 110 may assign different levels of permissions/restrictions to different verifiers 150. The VC 115 may permit/restrict verifying certain types of functions or statements. For example, the VC 115 may permit a verifier 150 to verify code generated within the same organization but not other organizations. The VC 115 may permit a verifier 150 to verify certain statements (e.g., that an anon_code_id satisfies k-anonymity but not differential privacy, or vice-versa). Generally, the trusted issuer 110 may assign the role of author 130 and verifier 150 to different individuals. In some cases, the individuals may be members of the same organization or different organizations.

The system may include an aggregation verifier 152 and/or an anonymization verifier 154. The aggregation verifier 152 may validate the results of an aggregation process (e.g., that agg_code_id was properly executed on data_x, data_y, etc., that the uploaders of data_x, data_y, etc. approved the aggregation, etc.). The aggregation verifier 152 may create a ver_agg_code_id, which may correspond to a verifiable statement that a specified agg_code_id was properly executed and/or that the result of executing agg_code_id on specified data is legitimate.

The anonymization verifier 154 may validate that a given anon_code_id accomplishes a specific task such as "PII-Free." The anonymization verifier 154 may publish a ver_anon_code_id that stating that a specified anon_code_id has been properly executed and/or that the result of executing anon_code_id on specified data is legitimate.

The blockchain 160 may be a distributed ledger system made up of a plurality of distributed nodes that make up a shared, replicated, synchronized data store. The distributed nodes may execute a consensus algorithm to determine the correct updated ledger to represent the addition of new data (e.g., following receiving a new artifact 165 from an author 130 or verifier 150). The distributed nodes may form a peer-to-peer network (e.g., within and/or across the computer network 199) to propagate updates once the correct updated ledger is determined. Each distributed node may then update itself accordingly. The result is a tamper resistant (e.g., immutable or substantially immutable) record of the received data replicated across multiple nodes and without a single point of failure.

The distributed ledger may be a linear data structure (e.g., a chain such as blockchain) or a more complex structure like a directed acyclic graph. A directed acyclic graph in the context of a distributed ledger may be made up of blocks of data and edges indicating adjacency of data blocks added to the distributed ledger. Each edge is directed, indicating a direction from an existing data block to a new data added to the existing data block. The structure is acyclic in that it contains no paths by which a data block can be crossed twice by traversing any sequence of edges according to their direction (e.g., no edges are directed "backwards" in time). A data block may, however, have multiple edges directed to it and/or away from it.

The consensus algorithm may be a proof-of-work algorithm or a proof-of-stake algorithm. A proof-of-work algorithm is a form of cryptographic proof a party can use to prove to others that it has performed a certain about of computational work. The proof is asymmetric in that a verifier may confirm the proof with minimal computational effort. An example of proof-of-work in the context of distributed ledgers is "mining" for cryptocurrency, where mining refers to the incentive structure used to encourage nodes to expend computational effort to add data blocks to the distributed ledger. In contrast, proof-of-stake protocols only allow nodes owning some quantity of data blocks (e.g., blockchain tokens) to validate and add new data blocks. Proof-of-stake protocols prevent attackers from hijacking validation by requiring an attacker to acquire a large proportion of data blocks. Proof-of-stake protocols include, for example, committee-based proof of stake, delegated proof of stake, liquid proof of stake, etc.

Distributed ledgers may be permissioned or permissionless. A permissioned distributed ledger may refer to a private system having a central authority for authorizing nodes to add data blocks. In some cases, a consortium may agree to operate a distributed ledger jointly among the participating organizations while excluding others. A permissionless distributed ledger may refer to an open or public network for which no access control is used. Any party may add to the distributed ledger, provided they satisfy the consensus algorithm (e.g., proof of work). An example of a permissionless distributed ledger is bitcoin and other cryptocurrencies that require new entries include a proof of work. In some implementations, the distributed nodes may be open (e.g., viewable by the public) to allow observers to see the artifacts 165.

The blockchain 160 may store various artifacts 165 corresponding to different operations of the system. For example, the blockchain 160 may store an AnonymizationQuery, which is created by an anonymizer author 134 (e.g., AnonymizerAuthor) and which links an anon_code_id to a statement (e.g., "anon_code_id is PII-Safe.").

An AnonymizationQueryResult may be created by the data custodian 140 and may represent an AttestedHTTPSStatement (e.g., a ZKP) that states, "I, the Data Custodian, verifiably executed anon_code_id on the uploaded data (which had a content hash [hash_id]) and produced the result [output_hash_id]."

An AnonymizationQueryVerification may be created by the anonymizer verifier 154 and may link a ver_anon_code_id to a particular anon_code_id.

A VerifiedAnonymizationQueryResult may represent the final result of running am anonymization script anon_code_id. The VerifiedAnonymizationQueryResult may prove that a data uploader has provided a specific form of anonymized data to the system. The data uploader may use the VerifiedAnonymizationQueryResul to prove to the system that the data uploader has released data under certain conditions and can be used by other users 120 to prove that their aggregate results contain this form of anonymized data. In some implementations, the verification code can be in the Rust programming language, which emphasizes type and memory safety (e.g., in contrast to C or C++). In some implementations, the function can be run in RISC Zero (a zero-knowledge verifiable general computing platform) to create a VerifiedAnonymizationQueryResultZKP.

An AggregateQuery may be created by an aggregate author 132 and may link an agg_code_id to a query_statement. For example, an author 130 may make a query_statement stating that the agg_code_id conforms to "differential privacy", "k-anonymity", "HEAgg", etc.

An AggregateQueryResult may be created by the data custodian 140 as an AttestedHTTPSStatement (e.g., ZKP) representing a non-repudiable statement: "I, the Data Custodian, verifiably ran anon_code_id/agg_code_id on the data source (which had content hash [hash_id]) and produced [output_hash_id]."

An AggregateQueryVerification may be created by an aggregate verifier 152 and may link a ver_agg_code_id to an agg_code_id.

A VerifiedAggregateQueryResult may represent the final output from the function performed by a verifier 150. The VerifiedAggregateQueryResult may confirm that a specific AggregateQueryResult is valid and was verifiably built on one or more anonymized data inputs.

Figure 2:
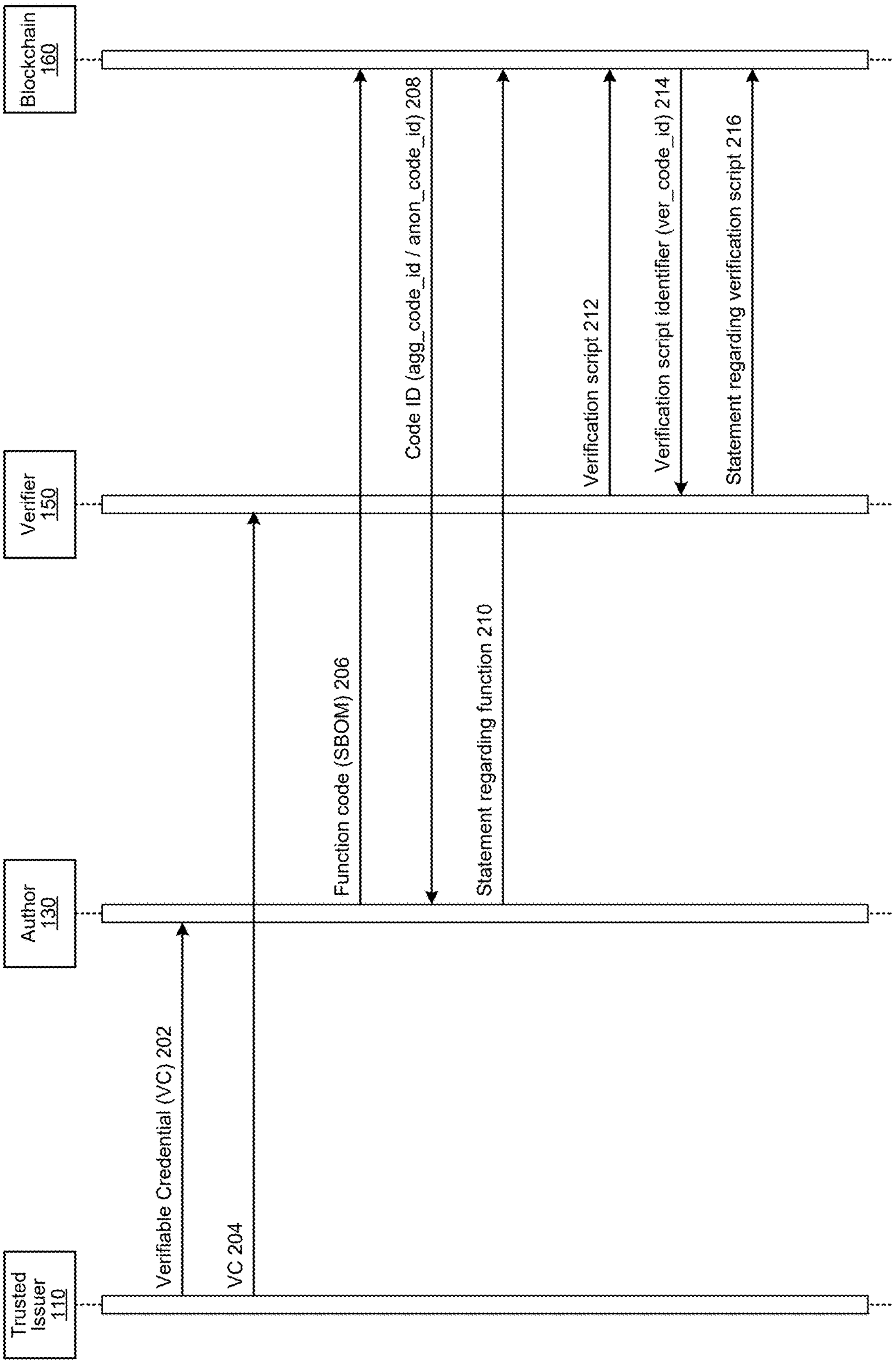
FIG. 2 is a signal flow diagram illustrating example operations of registering a function and a verification script on a distributed ledger, according to embodiments of the present disclosure.

FIG. 2 is a signal flow diagram illustrating example operations of registering a function and a verification script on a distributed ledger such as the blockchain 160, according to embodiments of the present disclosure. The function and/or script may be code defined by an SBOM uploaded to the blockchain 160 and assigned an identifier. The identifier for the code may be used to verify that the code is legitimate and will perform the intended function or verification.

The trusted issuer 110 may define roles and issue corresponding VCs. For example, the trusted issuer 110 may call a function to generate a VC with a parameter for the role (e.g., "generate_VC(AggregateAuthor)" or "generate_VC (AggregateVerifier)"). At step 202, the trusted issuer 110 may send the AggregateAuthor VC to the author 130. Similarly, at step 204, the trusted issuer 110 may send the AggregateVerifier VC (e.g., corresponding to the AggregateAuthor VC) and send it to the verifier 150.

At step 206, the author 130 may create a function and upload an SBOM specifying the function code to the blockchain 160 (e.g., "upload_sbom(agg_code)" or "upload_sbom(anon_code)"). The author 130 may digitally sign the SBOM such that later verification of the SBOM can include verifying that the author 130 (e.g., the holder of the key used to digitally sign the SCOM) possesses a VC 115 that permits it to make the statement(s) made regarding the properties and/or capabilities of the function defined by the SBOM. At step 208, the blockchain 160 may return a code identifier. The code identifier may be a hash (e.g., digest) of the SBOM uploaded at step 206. For example, agg_code_id may correspond to the hash of an aggregation function SBOM, and anon_code_id may correspond to the hash of an anonymization function SBOM (e.g., "return(agg_code_id)" or "return (anon_code_id)"). At step 210, the author 130 may upload a statement regarding properties and/or capabilities of the function to the blockchain 160, and associate with the code identifier received at step 208 (e.g., "create_statement(AggregateQuery)" with parameters "(agg_code_id, query_statement)"). This may serve to tie the function to the statement the author 130 makes about it. In some cases, the author 130 may digitally sign the SBOM prior to upload at step 206 such that later verification of the SBOM can include verifying that the author 130 (e.g., the holder of the key used to digitally sign the SCOM) possesses a VC 115 that permits it to make the statement(s) made regarding the function defined by the SBOM.

At step 212, the verifier 150 may create a verification function and upload an SBOM specifying the verification script to the blockchain 160 (e.g., "upload_sbom(ver_code) "). At step 214, the blockchain 160 may return a code identifier. For example, the code identifier may be ver_code_id (e.g., "return(ver_code_id)"), which represents a hash of the anonymization script SBOM. At step 216, the verifier 150 may upload a statement regarding the verification script to the blockchain 160, and associate with the code identifier received at step 214 (e.g., "create_statement(AggregateQueryVerification)" with parameters "(agg_code_id, ver_code_id)"). This may serve to tie the verification script to the anonymization/aggregation function it is to verify.

Figure 3:
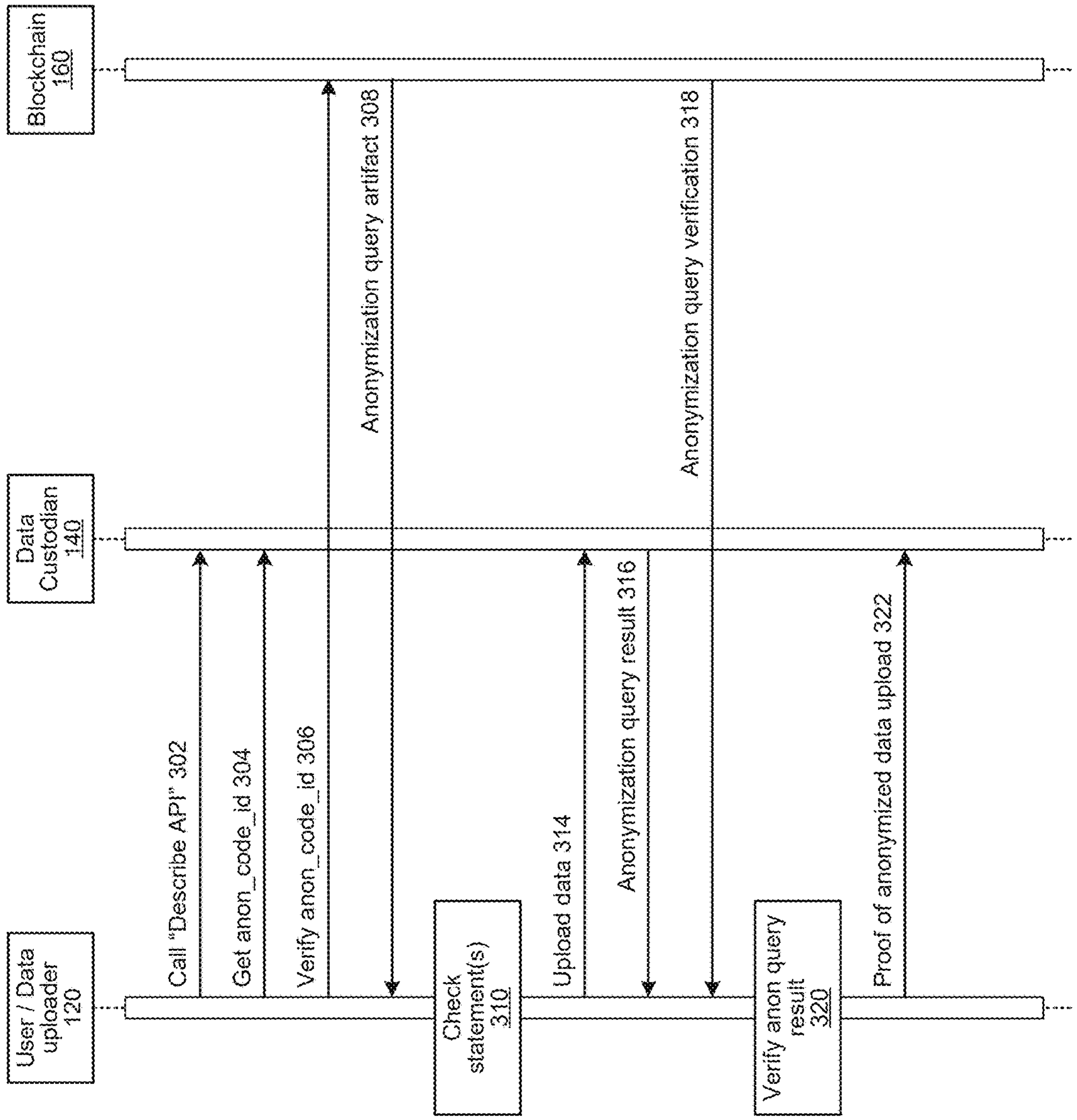
FIG. 3 is a signal flow diagram illustrating example operations of ingesting an anonymizing data, according to embodiments of the present disclosure.

FIG. 3 is a signal flow diagram illustrating example operations of ingesting an anonymizing data, according to embodiments of the present disclosure. The mechanism(s) described may protect a data uploader and provide proof that their data is anonymized during the upload process (e.g., before it is ever stored).

Prior to uploading data, the user 120 verifies the function at the specified verifiable upload endpoint 146. At step 302, the user 120 may send a "Describe API" call to the data custodian 140. For example, the user's client device may send a GET request to the data custodian's "Describe" endpoint (e.g., https . . . /upload/describe). At step 304, the data custodian's "Describe" endpoint (which may be an attested cloud function) may return digitally signed data containing the configuration of the /upload function. The data may be, for example, a JSON (JavaScript Object Notation) payload that includes the anon_code_id (and/or its reproducible hash/SBOM) and a URL to an upload endpoint that can be relied upon to anonymize the data upload using anon_code_id (e.g., the verifiable upload endpoint 146, which may be different from the "Describe" endpoint). For example, the "Describe" endpoint may be "faas.custodian.com" and may only be modifiable by the platform hosting custodian.com. The call to the "Describe API" may return a response that says "mycompany.api.custodian.com" runs "anon_code_id." If the data uploader trusts custodian.com, it can trust that data sent to mycompany.api.custodian.com will be anonymized using anon_code_id.

At step 306, the user 120 uses the anon_code_id to find the AnonymizationQuery artifact 165 associated with the anon_code_id on the blockchain 160. At step 308, the user 120 retrieves the AnonymizationQuery artifact from the blockchain 160. At step 310, the user 120 may check that anon_code_id was authored by an anonymizer author 134 holding a VC 115 from the trusted issuer 110, and that anon_code_id is associated with the appropriate statement (e.g., "PII-safe"). Thus, if the user 120 can trust that the data custodian 140 to abide by its FaaS interface and that the issuer 110 has correctly granted a VC 115 to a competent anonymization author 134, then the user 120 can trust that the uploaded data will be anonymized in a manner consistent with the statement(s) associated with the anon_code_id.

Having made these verifications, the user 120 may proceed with the upload. At step 314, the user 120 may upload their data to the endpoint 146. In response to the upload (and executing the anonymization script corresponding to anon-_code_id on the uploaded data), the data custodian 140 can generate an AnonymizationQueryResult and return it to the user 120 at step 316. The AnonymizationQueryResult can represent a statement (e.g., a ZKP), by the data custodian 140, that it verifiably ran anon_code_id on the uploaded data having hash_id to produce a result having output_hash_id. The data custodian 140 may return the AnonymizationQueryResult from the endpoint 146, and digitally sign the AnonymizationQueryResult with a private key corresponding to the endpoint 146. In some implementations, the AnonymizationQueryResult can be an AttestedHTTPStatement. For example, the data custodian 140 may provide the AnonymizationQueryResult to the user 120 via a service that can certify that a response originated from a particular endpoint. At step 318, the user 120 can use the AnonymizationQueryResult to find a corresponding AnonymizationQueryVerification on the blockchain 160. At step 320, the user 120 can use the AnonymizationQueryVerification to perform a verification to produce a VerifiedAnonymizationQueryResult, which links the AnonymizationQueryResult with the statement(s) made about the anon_code_id used to generate the AnonymizationQueryResult.

The verification performed by the user 120 at step 320 may itself have several stages. The anon_code_id may be associated with a ver_anon_code_id, which corresponds to a verification script that can perform one or a series of automated checks on anon_code_id. The verification script may confirm that the anon_code_id in the AnonymizationQueryResult matches the anon_code_id associated with the endpoint 146. The script can verify (e.g., cryptographically) that the AttestedHTTPSStatement signature comes from a trusted URL and signatory. If the user 120 determines that the AnonymizationQueryVerification passes these verifications, the verification script may evaluate the statements associated with anon_code_id and return the VerifiedAnonymizationQueryResult. VerifiedAnonymizationQueryResult may be a final, signed artifact attesting that the statement(s) regarding anon_code_id have been verified with respect to the anonymized uploaded data. In some implementations, the user 120 may store the VerifiedAnonymizationQueryResult artifact on the blockchain 160.

At step 322, the user 120 can use the VerifiedAnonymizationQueryResult to prove that specific uploaded data (e.g., represented by a hash of the raw data) was anonymized in a specific way (e.g., using an anonymization script corresponding to a specific anon_code_id) to generate specific output data (e.g., represented by a hash of the anonymized data). This process can provide a verifiable guarantee to the uploader that the specific URL they call will execute the specific, audited anonymization script, and that the data custodian 140 will store only the anonymized data.

Figure 4A:
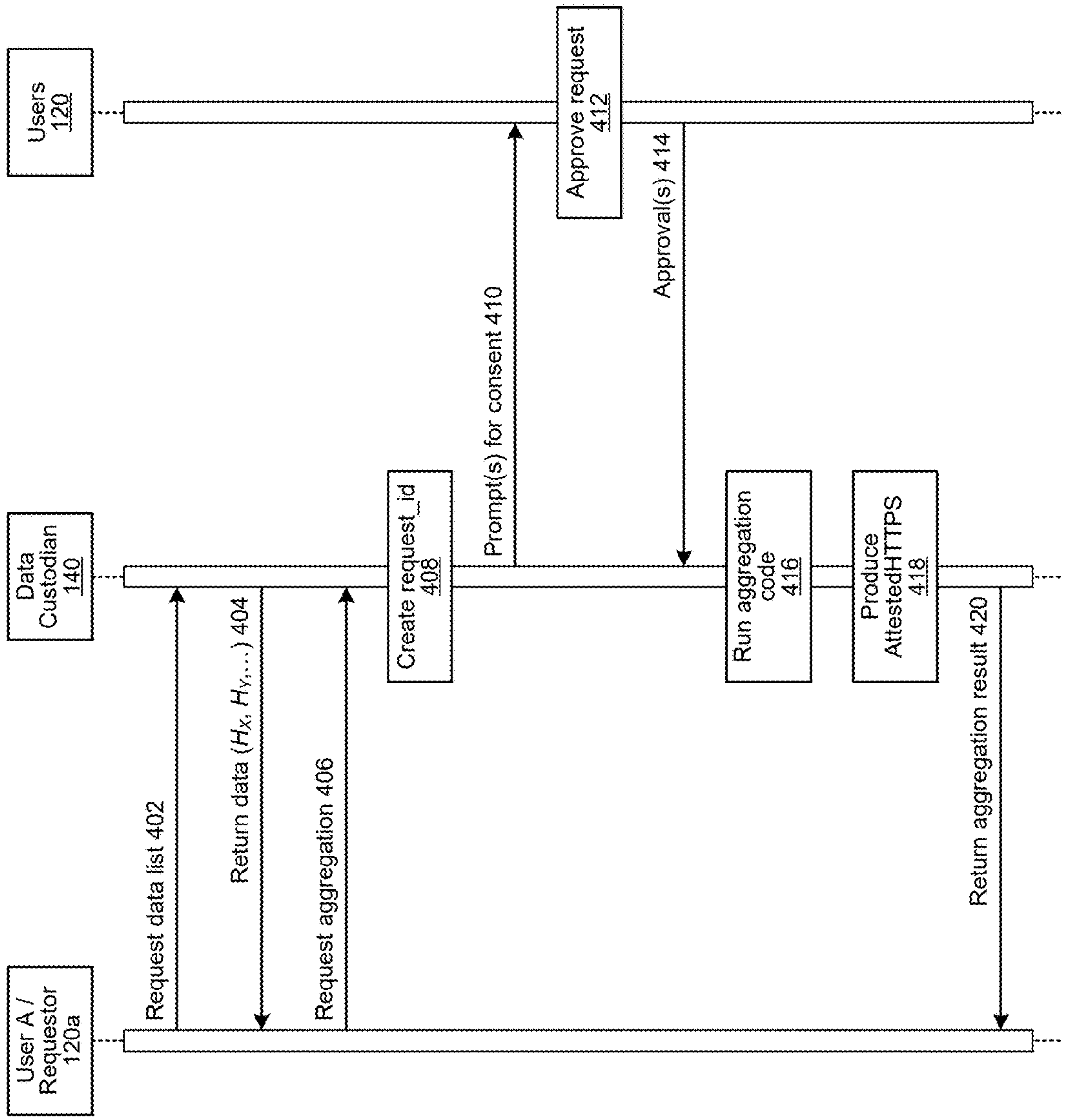
FIG. 4A is a signal flow diagram illustrating an example of executing an aggregation process, according to embodiments of the present disclosure.
Figure 4B:
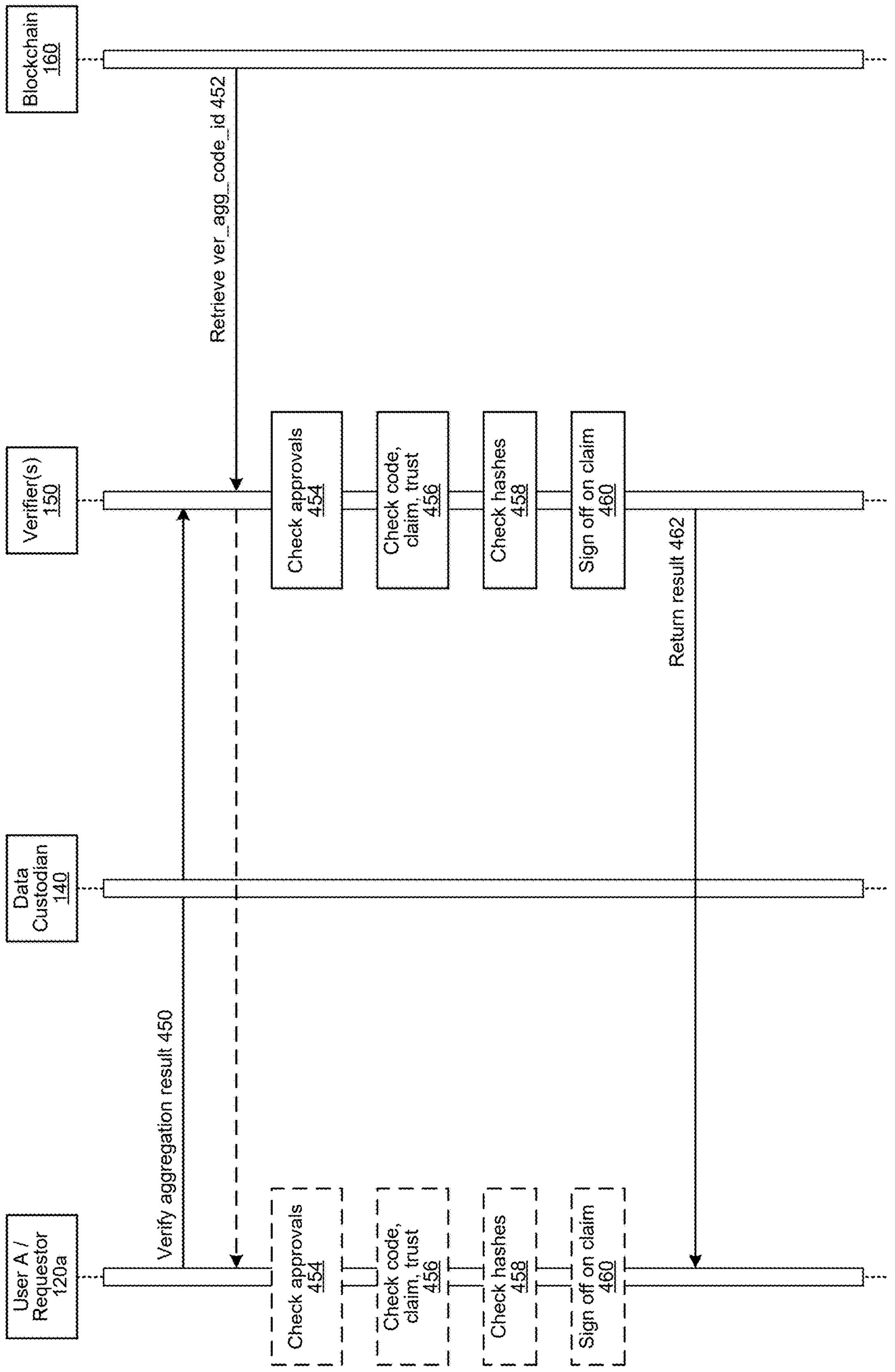
FIG. 4B illustrates an example of verifying the aggregation of FIG. 4A, according to embodiments of the present disclosure.

FIG. 4A is a signal flow diagram illustrating an example of executing an aggregation process, and FIG. 4B illustrates an example of verifying the aggregation, according to embodiments of the present disclosure. Beginning with FIG. 4A, at step 402, user A 120*a* (e.g., the requestor) may send a request for a data list to the data custodian 140. The list may include the list of users (data uploaders) that user A 120*a* is requesting data from (e.g., user B 120*b*, user C 120*c*, etc., collectively "users 120"). At step 404, the data custodian 140 may return a VerifiedAnonymizationQueryResult. The VerifiedAnonymizationQueryResult may indicate that anon_code_id was run on raw data having a hash $H_X$ and the result was anonymized data corresponding to the anonymized data having a hash $H_{X\_anon\_code\_id}$ (and so on for $H_Y$, $H_Z$, etc.). The returned data will correspond to the same anonymization statement (e.g., corresponding to the same anon_code_id) from the anonymization script run on the data upload from the users 120.

At step 406, user A 120*a* may send an aggregation request to the data custodian 140. The request may specify the aggregation function agg_code_id that user A wishes the data custodian 140 to perform. At step 408, the data custodian 140 may generate a one-time (e.g., random) universally unique identifier (UUID) request_id.

At step 410, the data custodian 140 may send a prompt for consent to each data uploader whose data user A has requested. For example, the data custodian 140 may send user B 120*b* a request to use the data corresponding to $H_X$, user C 120*c* a request for consent to use the data corresponding to $H_Y$, and so on. The prompt(s) may include the agg_code_id and/or its corresponding statement (e.g., that agg_code_id conforms to k-anonymity). At step 412, the users 120 may approve the request by digitally signing an approval that includes the AttestedHTTPS showing that $H_X$ comes from anonymization of user B's raw data (and similarly for $H_Y$ and user C, etc.). The approval may also include the anon_code_id of the anonymization script used to anonymize the uploaded data and the corresponding ver_anon_code_id verifying anon_code_id and its author's statements. In some implementations, one or more users 120 may pre-approve a request for aggregation code identifiers associated with a verification code identifier from a trusted verifier such as associated with a regulatory authority. In such cases, the user 120 may automate approval based on a permitted list of agg_code_ids/ver_agg_code_ids. The user(s) 120 may return the approval(s) at step 414.

Having received the approval(s), the data custodian 140 may run the aggregation function corresponding to agg_code_id at step 416. The data custodian 140 may receive the container corresponding to the aggregation function and/or reproduce the container itself (e.g. by starting with a base image from a trusted repository and adding layers/libraries as defined by the SBOM). In some cases, the requestor may provide the container. In some cases, a third party may reproduce the container. At step 418, the data custodian 140 may produce an AttestedHTTPSStatement that agg_code_id was run. The AttestedHTTPSStatement may reflect $H_X$, $H_Y$, etc., specified in the data list at step 402, the request_id assigned at step 408, and a hash of the final output ($H_O$). At step 420, the data custodian 140 may return the aggregation result in the form of the AttestedHTTPSStatement.

Proceeding to FIG. 4B, user A 120*a* (or a service provided by the system) may verify the aggregation result using one or more verification steps. For example, if the user A 120*a* calls on a verifier 150 to verify the aggregation result, user A 120*a* may, at step 450, send a request for verification to a verifier 150. The request may include the agg_code_id, hashes of the raw data and/or anonymized data (e.g., $H_X$ or $H_{X\_anon\_code\_id}$, etc.). At step 452, the verifier 150 may retrieve from the blockchain 160 a verification script having a ver_agg_code_id corresponding to the agg_code_id (the verification script having been stored on the blockchain 160 at, for example, step 212 as shown in FIG. 2). The verifier 150, executing the verification script, may perform several checks. At step 454, the verifier 150 may verify that the users 120 properly approved the requested aggregation at steps 412, 414. At step 456, the verifier 150 may verify that the data custodian 140 properly ran the correct agg_code_id (e.g., that the agg_code_id in the AggregationQueryResult matches the agg_code_id in the original request received at step 406), that the author 130 who created agg_code_id was authorized by its VC 115 to make the statement(s) made about agg_code_id, and that agg_code_id satisfied the statement(s). At step 458, the verifier may check the hashes $H_X$, $H_Y$, etc., processed by the aggregation function agg_code_id to verify that the data was used as claimed. At step 460, the verifier 150 may verify that $H_O$ satisfies the statement(s) made with regard to agg_code_id. Upon signing off on $H_O$, the verifier can produce a VerifiedAggregateQueryResult, and return it to user A 120*a* at step 462.

In some implementations, however, user a 120*a* may verify the aggregation result itself. For example, user A 120*a* may retrieve the ver_agg_code_id itself at 451, and perform the checks of steps 454 through 458, applying its own digital signature at step 460. In either case, user A 120*a* may use VerifiedAggregateQueryResult to prove to other users 120 that the statement(s) made with regard to agg_code_id hold true, that the users 120 who provided the input data to agg_code_id consented to the aggregation, and that agg_code_id was run on the anonymized versions of the input data (i.e., $H_X$, $H_Y$, etc.) to generate $H_O$.

Figure 5A:
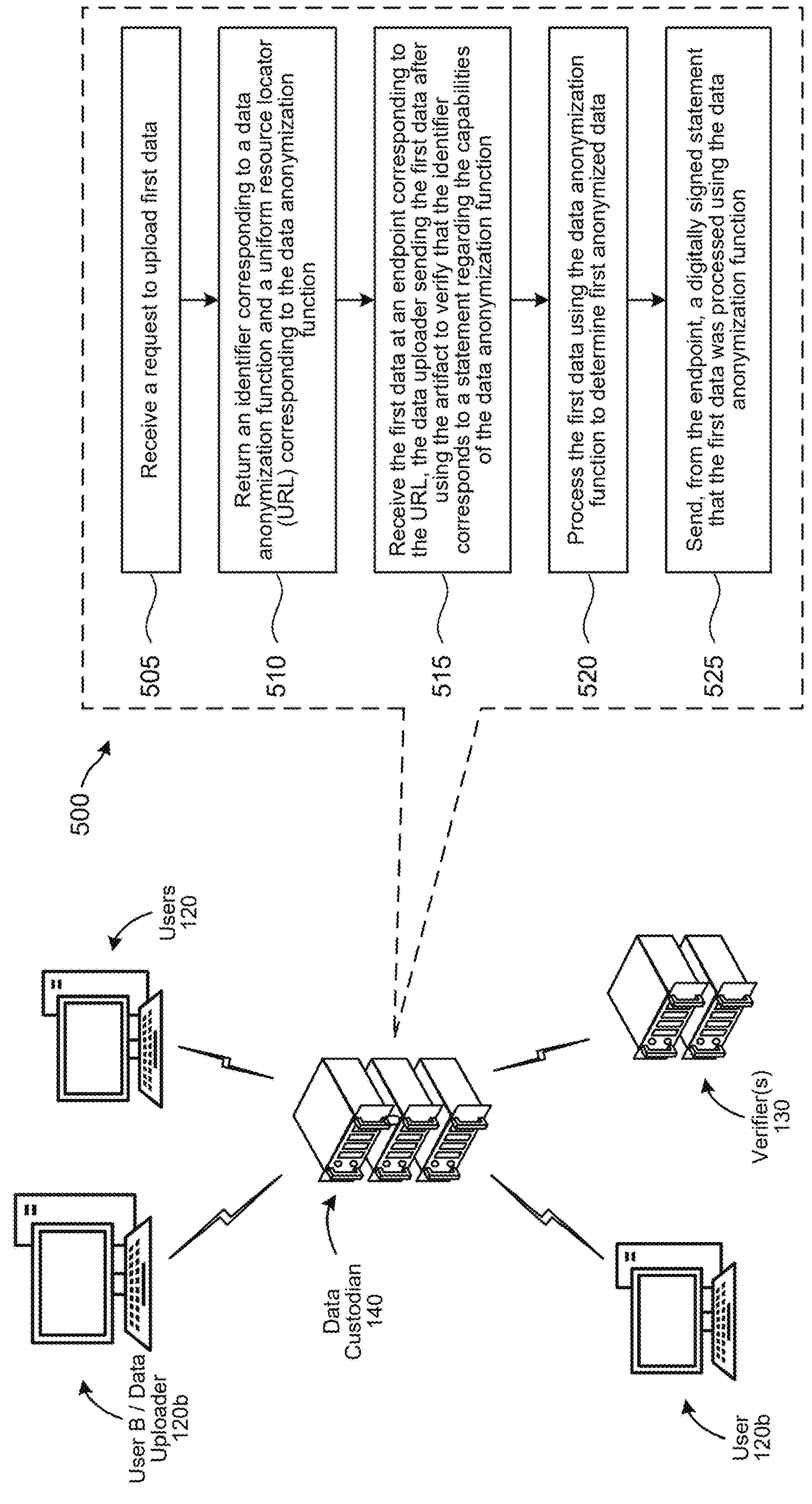
FIGS. 5A and 5B are conceptual diagrams illustrating example implementations of the system, according to embodiments of the present disclosure.
Figure 5B:
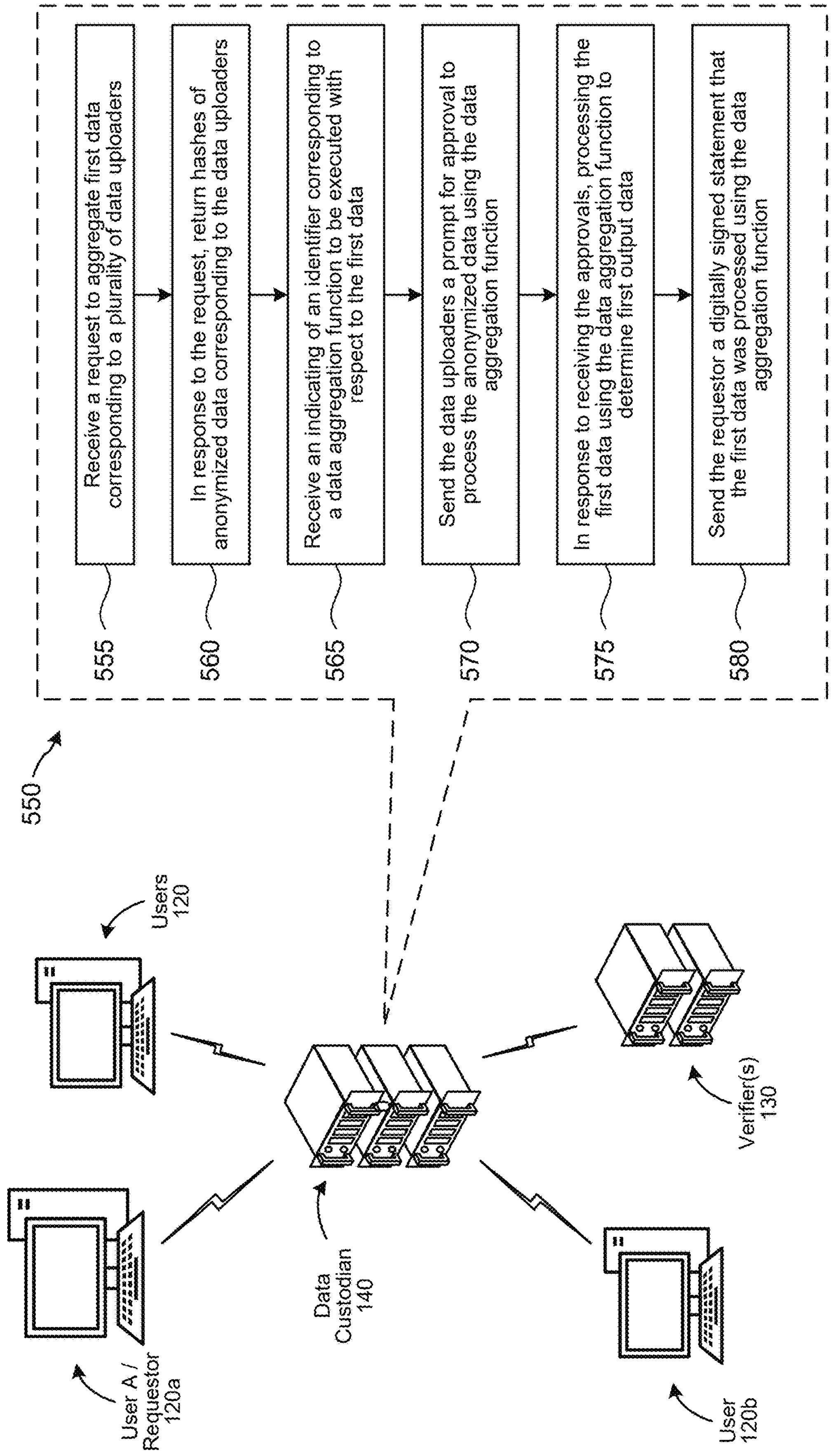

FIGS. 5A and 5B are conceptual diagrams illustrating example implementations of the system, according to embodiments of the present disclosure. FIG. 5A illustrates a first example method 500 of verifiable anonymous data aggregation. The method 500 may be performed by one or more system components corresponding to the data custodian 140 based on a requests received from one or more devices and/or system components corresponding to a data uploader (e.g., user B 120*b*). The method 500 may include receiving (505), from the data uploader, first request data representing a first request to upload first data. The method 500 may include sending (510), to the data uploader in response to the first request data, first response data. The first response data may include a first identifier corresponding to a data anonymization function, and a uniform resource locator (URL) corresponding to the data anonymization function. The first identifier may correspond to a first artifact stored on a distributed ledger (e.g., the blockchain 160). The first artifact may link the first identifier to a first statement regarding a property and/or capability of the data anonymization function as made by the author of the function. The method 500 may include receiving (515), the first data at an endpoint corresponding to the URL (e.g., a verifiable upload endpoint 146). The data uploader may upload the first data subject to using the first artifact stored in the distributed ledger to verify that the first identifier corresponds to the first statement. The method 500 may include processing (520) the first data using the data anonymization function to determine first anonymized data. For example, the data custodian 140 may receive, reproduce, and/or verify a container that corresponds to the first identifier (such that the container may be verified based on an SBOM or hash previously stored in the distributed ledger). The method 500 may include sending (525), from the endpoint, second response data representing a statement that the first data was processed using the data anonymization function. The second response data may be digitally signed using a private key corresponding to the endpoint 146, giving the recipient assurance that the statement came from the endpoint that received the first data and which runs anon_code_id. In some implementations, the second response data may be an attested HTTPS statement made by the data custodian 140 and/or a service that can certify the second response data originated from the endpoint 146. In some cases, the data uploader may verify (or request verification) of the result (e.g., the attested HTTPS statement) sent at step 525. The data uploader may use the result to prove that specific uploaded data (e.g., represented by a hash of the raw data) was anonymized in a specific way (e.g., using an anonymization script corresponding to the first identifier) to generate specific output data (e.g., represented by a hash of the anonymized data).

FIG. 5B illustrates a second example method 550 of verifiable anonymous data aggregation. The method 550 may be performed by one or more system components corresponding to the data custodian 140 based on a requests received from one or more devices and/or system components corresponding to a requestor (e.g., user A 120*a*). The method 550 may include receiving (555), from the requestor, first request data representing a first request to aggregate first data corresponding to a plurality of data uploaders including at least a first data uploader (e.g., user B 120*b*) and a second data uploader (e.g., user C 120*c*). In some cases, however, the plurality of data uploaders may include many more users 120. The method 550 may include sending (560), in response to the first request data, first response data representing a first hash of first anonymized data corresponding to the first data uploader and a second hash of second anonymized data corresponding to the second data uploader. The hashes of the anonymized data may allow the requestor (and others) to verify that the aggregation function was applied to the data specified in the aggregation request. The method 550 may include receiving (565) second request data indicating a first identifier corresponding to a data aggregation function to be executed with respect to the first data. The first identifier may correspond to a hash of an SBOM specifying a container that may be reproduced to perform the requested data aggregation function. The method 550 may include sending (570) to the plurality of data uploaders, prompts for approval to process the first anonymized data using the data aggregation function. In response to receiving approval from the first data uploader and the second data uploader, the method 550 may include processing (575) the first data using the data aggregation function to determine first output data. The method 550 may include sending (580), to the first one or more system components, second response data representing a statement that the first data was processed using the specified data aggregation function. The second response data may be digitally signed using a private key of the data custodian 140. In some implementations, the second response data may be an attested HTTPS statement made by the data custodian 140 and/or a service that can certify the second response data originated from the data custodian 140. In some implementations, the requestor may verify (or request verification) of the second response data. In either case, the verification may serve to prove to other users 120 (including the data uploaders) that the statement(s) made with regard to the aggregation function hold true, that the users 120 who provided the input data to the aggregation function consented to the aggregation, and that the specified aggregation was run on the anonymized versions of the input data to generate the first output data.

Figure 6:
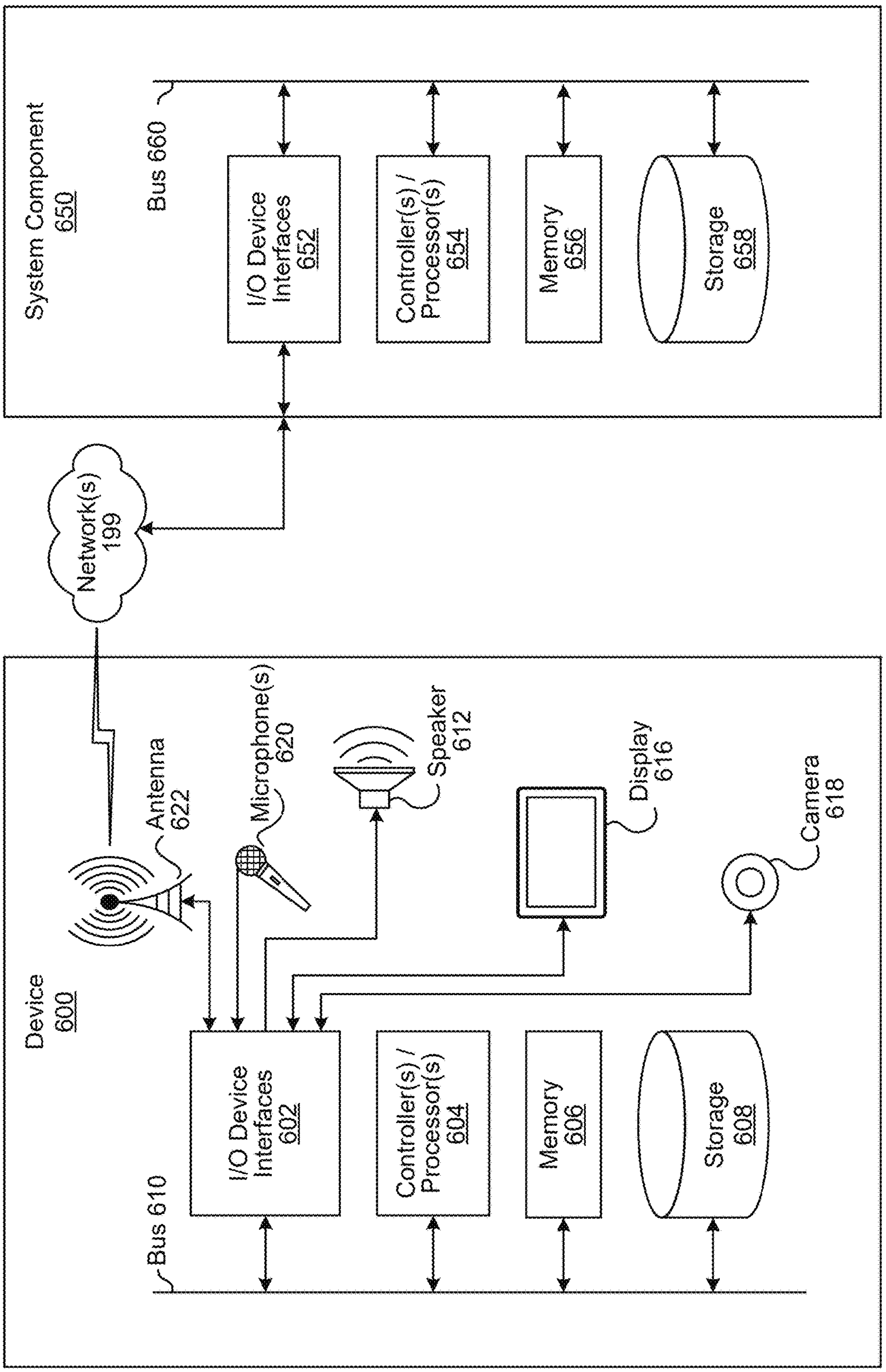
FIG. 6 is a block diagram illustrating an example client device and system component communicating over a computer network, according to embodiments of the present disclosure.

FIG. 6 is a block diagram illustrating an example client device 600 and system component 650 communicating over a computer network 199, according to embodiments of the present disclosure. While the device 600 may operate locally to a user (e.g., within a same environment so the device may receive inputs and playback outputs for the requestor) the system component(s) 650 may be located remotely from the device 600. The system component(s) 650 may be located in an entirely different location from the device 600 (for example, as part of a cloud computing system or the like).

The device 600 may include one or more controllers/processors 604, which may each include a central processing unit (CPU) for processing data and computer-readable instructions, and a memory 606 for storing data and instructions of the respective device. The memories 606 may individually include volatile random-access memory (RAM), non-volatile read only memory (ROM), non-volatile magnetoresistive memory (MRAM), and/or other types of memory. Device 600 may also include a data storage component 608 for storing data and controller/processor-executable instructions. Each data storage component 608 may individually include one or more non-volatile storage types such as magnetic storage, optical storage, solid-state storage, etc. Device 600 may also be connected to removable or external non-volatile memory and/or storage (such as a removable memory card, memory key drive, networked storage, etc.) through respective input/output device interfaces 602.

Computer instructions for operating device 600 and its various components may be executed by the respective device's controller(s)/processor(s) 604, using the memory 606 as temporary "working" storage at runtime. A device's computer instructions may be stored in a non-transitory manner in non-volatile memory 606, data storage component 608, or an external device(s). Alternatively, some or all of the executable instructions may be embedded in hardware or firmware on the respective device in addition to or instead of software.

Device 600 includes input/output device interfaces 602. A variety of components may be connected through the input/output device interfaces 602, as will be discussed further below. Additionally, device 600 may include an address/data bus 610 for conveying data among components of the respective device. Each component within a device 600 may also be directly connected to other components in addition to (or instead of) being connected to other components across the bus 610.

The device 600 may include input/output device interfaces 602 that connect to a variety of components such as an audio output component such as a speaker 612, a wired headset or a wireless headset (not illustrated), or other component capable of outputting audio. The device 600 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 600 may additionally include a display 616 for displaying content. The device 600 may further include a camera 618.

Via antenna(s) 622, the input/output device interfaces 602 may connect to one or more computer networks 199 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 4G network, 5G network, etc. A wired connection such as Ethernet may also be supported. Through the network(s) 199, the system may be distributed across a networked environment. The I/O device interface 602 may also include communication components that allow data to be exchanged between devices such as different physical servers in a collection of servers or other components.

The system component 650 may include one or more physical devices and/or one or more virtual devices, such as virtual systems that run in a cloud server or similar environment. The system component 650 may include one or more input/output device interfaces 652 and controllers/processors 654. The system component 650 may further include a memory 656 and storage 658. A bus 660 may allow the input/output device interfaces 652, controllers/processors 654, memory 656, and storage 658 to communicate with each other; the components may instead or in addition be directly connected to each other or be connected via a different bus.

A variety of components may be connected through the input/output device interfaces 652. For example, the input/output device interfaces 652 may be used to connect to the computer network 199. Further components include keyboards, mice, displays, touchscreens, microphones, speakers, and any other type of user input/output device. The components may further include USB drives, removable hard drives, or any other type of removable storage.

The controllers/processors 654 may process data and computer-readable instructions and may include a general-purpose central-processing unit, a specific-purpose processor such as a graphics processor, a digital-signal processor, an application-specific integrated circuit, a microcontroller, or any other type of controller or processor. The memory 656 may include volatile random-access memory (RAM), non-volatile read only memory (ROM), non-volatile magnetoresistive (MRAM), and/or other types of memory. The memory 656 may be used for storing data and controller/processor-executable instructions on one or more non-volatile storage types, such as magnetic storage, optical storage, solid-state storage, etc.

Computer instructions for operating the system component 650 and its various components may be executed by the controller(s)/processor(s) 654 using the memory 656 as temporary "working" storage at runtime. The computer instructions may be stored in a non-transitory manner in the memory 656, storage 658, and/or an external device(s). Alternatively, some or all of the executable instructions may be embedded in hardware or firmware on the respective device in addition to or instead of software.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving, from first one or more system components corresponding to a first data uploader, first request data representing a first request to upload first data;

sending, in response to the first request data, first response data representing (i) a first identifier corresponding to a data anonymization function, and (ii) a uniform resource locator (URL) corresponding to the data anonymization function, wherein the first identifier corresponds to a first artifact, stored on a distributed ledger, that links the first identifier to a first statement regarding the data anonymization function;

in response to the first one or more system components using the first artifact to verify that the first identifier corresponds to the first statement, receiving the first data at an endpoint corresponding to the URL;

processing the first data using the data anonymization function to determine first anonymized data; and sending, from the endpoint in response to receiving the first data, second response data representing a first statement that the first data was processed using the data anonymization function, the second response data bearing a digital signature corresponding to the endpoint.

2. The computer-implemented method of claim 1, further comprising:

prior to receiving the first request data, determining the first identifier using the data anonymization function; and storing, in the distributed ledger, second data representing an association between the first identifier and the first statement.

3. The computer-implemented method of claim 1, further comprising:

prior to receiving the first request data, determining that the data anonymization function satisfies the first statement; and storing, in the distributed ledger, second data representing the first identifier and an indication that data anonymization function satisfies the first statement.

4. The computer-implemented method of claim 1, further comprising:

retrieving, by the first one or more system components from the distributed ledger, second data representing the first identifier and an indication that data anonymization function satisfies the first statement.

5. The computer-implemented method of claim 1, further comprising:

receiving, by second one or more system components corresponding to an author of the data anonymization function, a verified credential representing permission to create functions corresponding to the first statement;

creating the data anonymization function; and determining, based on the data anonymization function, the first identifier.

6. The computer-implemented method of claim 5, further comprising:

sending, by the first one or more system components to a second system component, second data representing the second response data, the second data proving that the first data was processed using the data anonymization function upon upload.

7. A system, comprising:

one or more processors; and at least one memory comprising instructions that, when executed by the one or more processors, cause the system to:

receive, from first one or more system components corresponding to a first data uploader, first request data representing a first request to upload first data;

send, in response to the first request data, first response data representing (i) a first identifier corresponding to a data anonymization function, and (ii) a uniform resource locator (URL) corresponding to the data anonymization function, wherein the first identifier corresponds to a first artifact, stored on a distributed ledger, that links the first identifier to a first statement regarding the data anonymization function;

in response to the first one or more system components using the first artifact to verify that the first identifier corresponds to the first statement, receive the first data at an endpoint corresponding to the URL;

process the first data using the data anonymization function to determine first anonymized data; and send, from the endpoint in response to receiving the first data, second response data representing a first statement that the first data was processed using the data anonymization function, the second response data bearing a digital signature corresponding to the endpoint.

8. The system of claim 7, wherein the at least one memory further comprises instructions that, when executed by the one or more processors, further cause the system to:

prior to receiving the first request data, determine the first identifier using the data anonymization function; and store, in the distributed ledger, second data representing an association between the first identifier and the first statement.

9. The system of claim 7, wherein the at least one memory further comprises instructions that, when executed by the one or more processors, further cause the system to:

prior to receiving the first request data, determine that the data anonymization function satisfies the first statement; and store, in the distributed ledger, second data representing the first identifier and an indication that data anonymization function satisfies the first statement.

10. The system of claim 7, wherein the at least one memory further comprises instructions that, when executed by the one or more processors, further cause the system to:

retrieve, by the first one or more system components from the distributed ledger, second data representing the first identifier and an indication that data anonymization function satisfies the first statement.

11. The system of claim 7, wherein the at least one memory further comprises instructions that, when executed by the one or more processors, further cause the system to:

receive, by second one or more system components corresponding to an author of the data anonymization function, a verified credential representing permission to create functions corresponding to the first statement;

create the data anonymization function; and determine, based on the data anonymization function, the first identifier.

12. The system of claim 11, wherein the at least one memory further comprises instructions that, when executed by the one or more processors, further cause the system to:

send, by the first one or more system components to a second system component, second data representing the second response data, the second data proving that the first data was processed using the data anonymization function upon upload.

* * * * *